US008745741B1

(12) United States Patent
Tice et al.

(10) Patent No.: US 8,745,741 B1
(45) Date of Patent: Jun. 3, 2014

(54) DETECTING AND HANDLING VTABLE POINTER CORRUPTION

(75) Inventors: Caroline Tice, Mountain View, CA (US); Geoffrey Roeder Pike, San Francisco, CA (US); Úlfar Erlingsson, Palo Alto, CA (US); Lawrence Alan Crowl, Mountain View, CA (US); Cary Allen Coutant, Saratoga, CA (US); Xinliang David Li, Palo Alto, CA (US); Sriraman Tallam, Sunnyvale, CA (US); Kenneth Buchanan, Waterloo (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/601,950

(22) Filed: Aug. 31, 2012

(51) Int. Cl.
*G06F 21/00* (2013.01)
*H04L 29/06* (2006.01)

(52) U.S. Cl.
USPC .............................. 726/22; 726/26; 713/164

(58) Field of Classification Search
USPC .................. 726/22, 25, 26; 713/164
See application file for complete search history.

(56) References Cited

U.S. PATENT DOCUMENTS

2012/0144480 A1* 6/2012 Miller et al. ............... 726/22

FOREIGN PATENT DOCUMENTS

CA 2266912 C * 3/2004

OTHER PUBLICATIONS

Carsten Weinhold, Hermann Härtig; "VPFS: building a virtual private file system with a small trusted computing base"; Apr. 2008; Eurosys '08: Proceedings of the 3rd ACM SIGOPS/EuroSys European Conference on Computer Systems 2008; Publisher: ACM; pp. 81-93.*

* cited by examiner

*Primary Examiner* — Hadi Armouche
*Assistant Examiner* — Courtney Fields
(74) *Attorney, Agent, or Firm* — McDermott Will & Emery LLP

(57) ABSTRACT

A system and method is disclosed for providing security in virtual function calling. During a build process a program code is analyzed to identify one or more call sites used to facilitate a call to a subroutine associated with a declared object type. One or more trusted vtable pointers to a respective subroutine is determined, and the program is configured, via the build process, to detect, at an execution time, an initiation of a virtual call at a call site, verify whether a vtable pointer used in connection with the call site is associated with at least one of the trusted vtable pointers, and, if verified, facilitate the virtual call using the call site. If the vtable pointer cannot be verified then the virtual call is aborted.

19 Claims, 5 Drawing Sheets

DETECTING AND HANDLING VTABLE POINTER CORRUPTION

BACKGROUND

Implementations of programming languages often represent polymorphic objects (or classes) with virtual tables. A virtual table, or vtable, is a table of pointers to functions or methods of a class. A programming system (for example, a compiler) creates a vtable for each class that contains virtual functions. When an object is created from a class, a pointer to the vtable is included as a hidden member of the object. During execution of a program, an object's vtable pointer (a reference to a location in memory where a corresponding vtable is stored) may become corrupted, either by implementation failures, buffer overruns, malicious attacks, or the like. Corruption of the vtable pointer can lead to deviations from the intended program execution with possibly disastrous results.

SUMMARY

The subject technology provides a system and computer-implemented method for detecting and handling corruption of pointers to vtables. According to some aspects, a computer-implemented method may include determining one or more trusted memory locations used to facilitate virtual calls, modifying, during a build process, at least a portion of code associated with one or more virtual call sites to facilitate a verification of a respective memory location before the respective memory location is used to facilitate a virtual call, detecting, at an execution time, an initiation of a virtual call using a memory location, verifying whether the memory location is in the one or more trusted memory locations, and facilitating the virtual call using the memory location if the memory location can be verified, and preventing the virtual call if the memory location cannot be verified. Other aspects include corresponding systems, apparatus, and computer program products for implementation of the method.

The previously described aspects and other aspects may include one or more of the following features. For example, determining one or more trusted memory locations used to facilitate virtual calls may comprise determining one or more declared object types, and, for each declared object type, determining a memory location of a virtual function table corresponding to one or more subroutines implemented by the declared object type, the memory location of the virtual function table being determined for the execution time. Additionally or in the alternative, the method may further comprise monitoring a memory space for the introduction of new executable code into a running program, the new executable code comprising one or more virtual call sites, determining, for each of the one or more virtual call sites, one or more corresponding trusted memory locations used to facilitate a virtual call by the virtual call site, and, on detecting an initiation of a virtual call associated with the new executable code, verifying whether a memory location used by the virtual call is in the one or more corresponding trusted memory locations.

In another aspect, the computer-implemented method may include determining a set of one or more allowable destinations for an indirect control flow instruction, modifying, during a build process, at least a portion of code associated with one or more indirect control flow instructions to facilitate a verification of a destination corresponding to the one or more indirect control flow instructions, detecting, at an execution time, an initiation of the indirect control flow instruction, verifying whether a destination to be used in connection with the indirect control flow instruction is in the set of allowable destinations for the indirect control flow instruction, and invoking, if the destination is not in the set, a predetermined error handler.

In other aspects, a machine-readable media may include instructions thereon that, when executed, perform the computer-implemented method. In this regard, the method may include identifying one or more call sites used to facilitate virtual calls, determining, for each of the call sites, one or more trusted pointer values for the call site, detecting, at an execution time, an initiation of a virtual call using a first call site, verifying whether a pointer provided to the first call site is associated with at least one of the trusted pointer values, and facilitating the virtual call using the call site if the pointer can be verified, and aborting the virtual call if the memory location cannot be verified. Other aspects include corresponding systems, apparatus, and computer program products for implementation of the computer implemented method.

In a further aspect, a system may include a processor and a memory. The memory may include compiler instructions that, when executed, cause the processor to identify, in a program code, one or more call sites used to facilitate a call to a subroutine associated with a declared object type, determine, for each of the call sites, one or more trusted locations of a corresponding subroutine, and configure the program code to detect, at an execution time, an initiation of a virtual call at a call site, verify that a subroutine location used in connection with the call site is associated with at least one of the trusted locations, and facilitate the virtual call using the call site.

The previously described aspects and other aspects may provide one or more advantages, including, but not limited to, detecting and handling corruption of memory locations and vtables at runtime. The subject technology may be implemented to enhance security for code bases that are publicly accessible by providing a mechanism to discover attacks or exploitation of previously undiscovered program faults by an attacker. Furthermore, a compiler may be modified to utilize the subject technology to produce a security mechanism that may be ported to disparate systems without changing or otherwise modifying the application binary interface (ABI) of a system when the program code, including the security mechanism, is executed.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
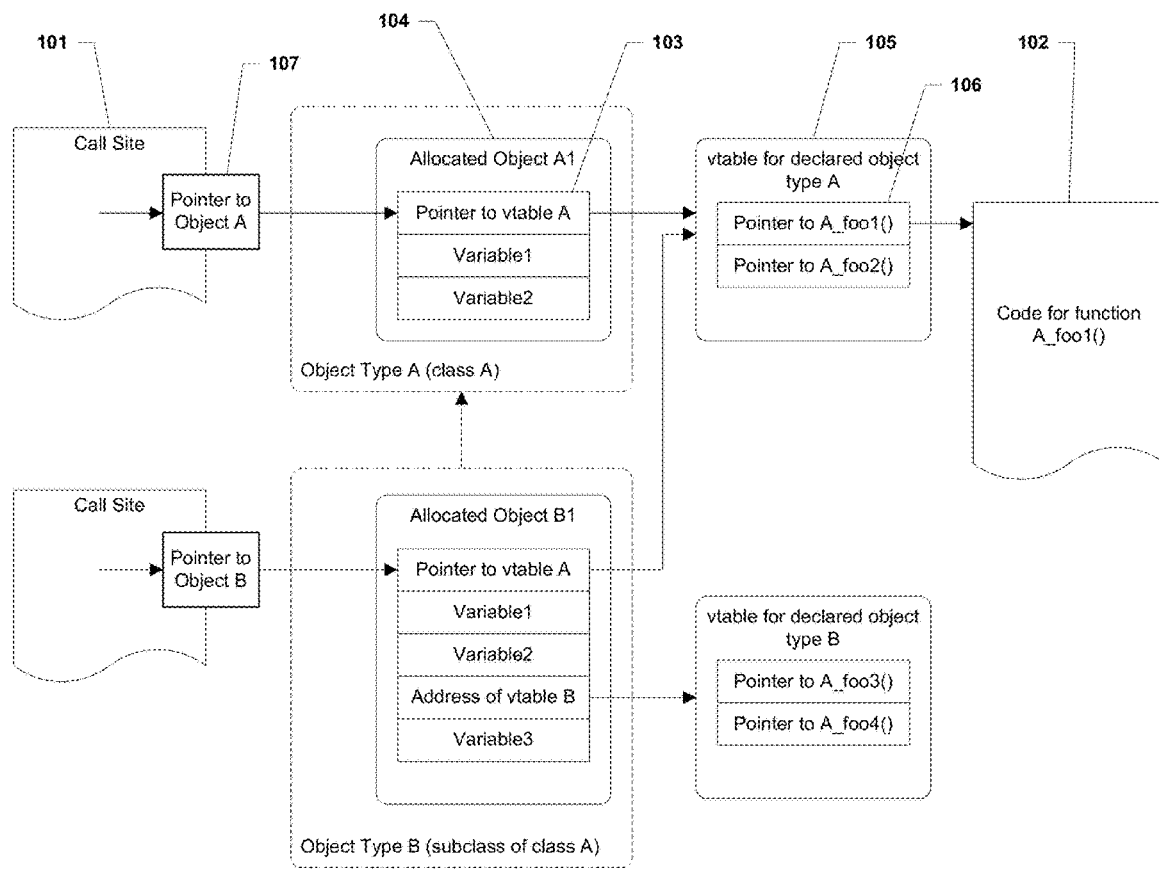
FIG. 1 is a diagram illustrating an example of virtual function calling.

In some instances, an object will be freed from memory but a currently executing program will (for example, erroneously) maintain a pointer to the object even though the object may no longer exist. An attacker may cause the region of memory that formerly contained the freed object to be modified, and/or may overwrite the object's vtable pointer (for example, a virtual address/pointer to the object's vtable) so that it points to a counterfeit vtable. When the program code seeks to reuse the object, the counterfeit vtable may cause the program code to execute malicious code designated by the relevant portions of counterfeit vtable.

An object's vtable pointer may be compromised in different ways. Often, an attacker will not have control of a program's system functions but will have control of input and output to the program. In this respect, an attacker may force the program to make allocations of memory based on the format of data provided as an input to the program function that the attacker gives it. For example, the attacker may gain access to a web browser program by convincing the program's user to navigate to a web page controlled by the attacker. In some aspects, the web page code may cause a buffer overrun in certain functions of the web browser, leading to corruption of memory space, including vtable pointers. In other aspects, the web page may cause the web browser program to display images or text within the web browser at a particular time. The image data or text may include pointers that are placed in memory and/or misinterpreted because of a pre-existing use-after-free-bug or buffer overrun. When the pointers are reused by the web browser program control of the program is transferred to a location that the attacker chose.

In many instances, vtables are initially created in read only memory, set up at the beginning of a program's execution and never change. Similarly, the code corresponding to the functions pointed to by the vtables are also fixed in memory. A vtable pointer, however, is often allocated in read-write memory, and not fixed. Rather, the vtable pointer may be created and destroyed in connection with the instantiation and destruction of an object, the location and value of the pointer being tied to the address assigned to the object when it is instantiated. In this respect, vtable pointers are subject to corruption, for example, by implementation errors or malicious conduct.

The subject technology provides a computer-enabled system and method for providing security in virtual function calling. According to one aspect, vtable pointers are protected at runtime from corruption and malicious conduct. To facilitate protection of vtable pointers, a compiler may be modified to provide, in connection with compiling and/or linking a library (for example, a shared library) or executable, a vtable mapping between declared classes of objects, and respective vtable pointer values for those classes. The vtable mapping indicates the set of trusted vtables corresponding to an object by providing one or more pointer values that are trusted to point to those trusted vtables. Before a function is called through a vtable, the vtable mapping may be checked to verify that the vtable to be accessed is a correct vtable for the object responsible for providing the called function.

FIG. 1 is a diagram illustrating an example of virtual function calling, according to one aspect of the subject technology. In the depicted example, a call site 101 (also termed "indirect control flow instruction") is a portion of code which calls (or may call, through dynamic dispatch) a subroutine 102. Subroutine 102 (also termed "function," "method," "procedure," "routine," "subprogram" and the like) may be compiled into a library and/or associated with an object type (for example, as a member function of a class). The call site passes zero or more arguments to the subroutine, and receives zero or more return values.

In some aspects, subroutine 102 is at a destination address. The call site calls the subroutine through a pointer 103. If, as shown in the depicted example, the call site is referenced from a polymorphic object 104 (for example, when calling a member function of an instantiated object), pointer 103 may point to a location in memory of a virtual function table 105 (also termed virtual method table, virtual call table, dispatch table, or vtable). Vtable 105 includes an array of one or more function pointers 106 to one or more respective subroutines 102. When the polymorphic object is created, vtable pointer 103 to the respective vtable is added as a hidden member of the object. Call site 101 may receive an object pointer 107 that points to the memory location of the polymorphic object. Subroutine 102 may be called by dereferencing object pointer 107 to discover pointer 103, then dereferencing pointer 103 to discover vtable 105, then dereferencing the function pointer 106 corresponding to subroutine 102. It is understood that this procedure is automatically executed in most programming languages. It is also understood for the purpose of this disclosure that the term "pointer" and "memory location" or "memory address" may be used interchangeably.

Different call sites may use the same pointers to call the same subroutine. Under the principles of object polymorphism, a vtable pointer may change depending on the type of object that was created. In this respect, FIG. 1 depicts two objects: a first object ("Object A1") and a second object ("Object B1") which is derived from the first object. In some aspects, a derived object shares a vtable with the base class ("Object A1") from which it was derived.

Figure 2:
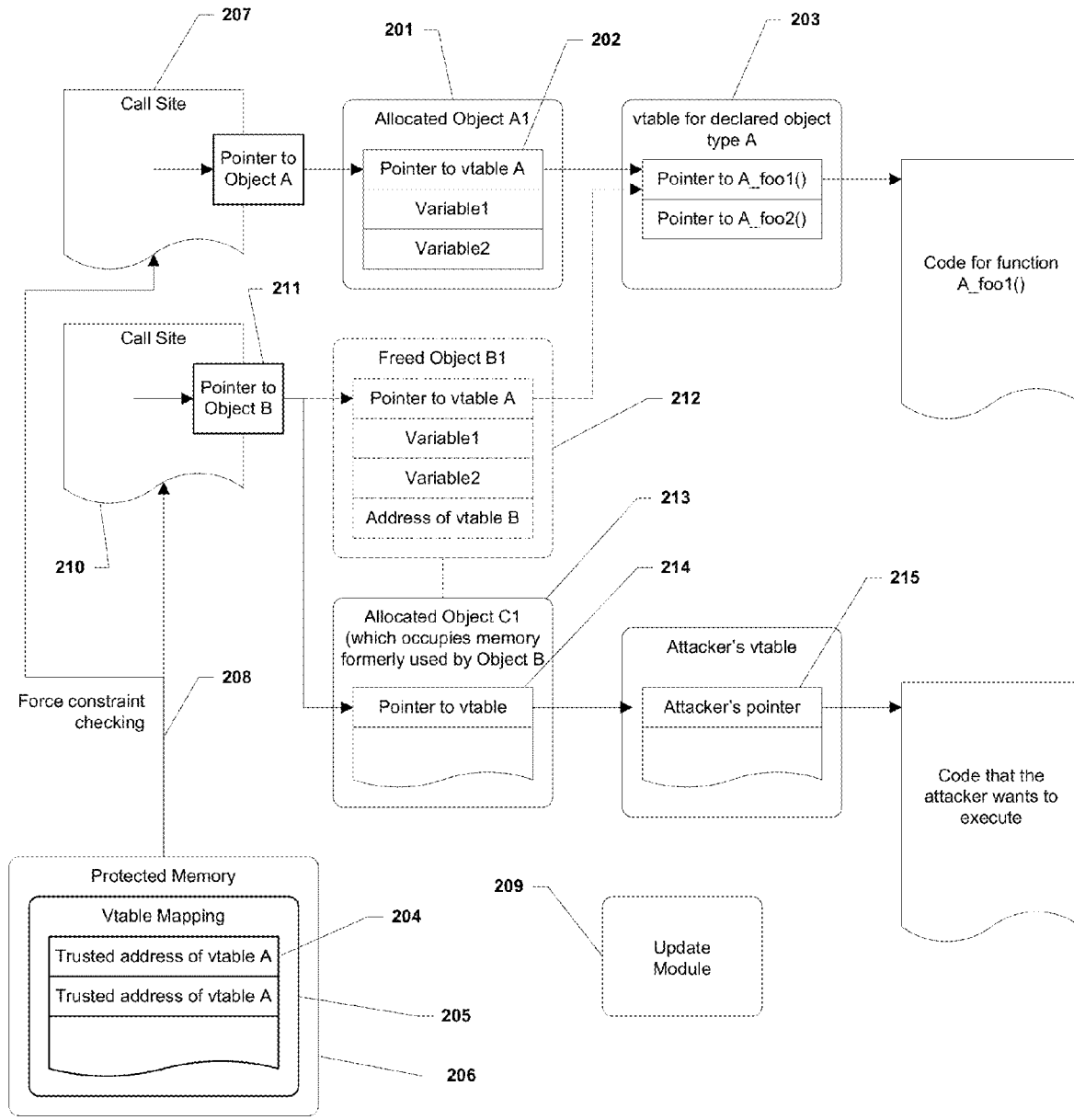
FIG. 2 is a diagram illustrating an example of verifying a pointer used to facilitate a virtual call.

FIG. 2 is a diagram illustrating an example of verifying a pointer used to facilitate a virtual call, according to one aspect of the subject technology. When an object 201 is instantiated, the object will include a pointer 202 to a vtable 203 for the object's declared type. In certain aspects, the source code for the program (and/or related objects) that is executed by a computer system is informative as to what objects may be instantiated and/or used during program execution. Accordingly, when a compiler (for example, a compiler program and/or system configured to compile software) implementing the subject technology is parsing classes in a block of source code, the compiler keeps a record of the inheritance hierarchy for each declared class, and maintains information on what objects will be called at runtime. From this information, the compiler identifies a set of trusted vtables, and their respective memory addresses 204, for each declared type of object. In some aspects, the compiler may also identify when a vtable from each set may be called during program execution.

In this regard, the compiler generates, for a declared object type, a vtable mapping 205 that may be used at runtime to verify a vtable pointer (for example, pointer 202) purporting to point to a vtable (for example, vtable 203) for the declared object type. Vtable mapping 205 may be stored as a table that maps a base class to a set of trusted vtables for that base class by providing a set of trusted memory locations corresponding to the vtables. In one aspect, a vtable mapping for a class may be generated and included within the assembly file generated from the object's class source file by the compiler, and, on assembling, linking and loading, the vtable mapping may be generated and placed in a protected (for example, read-only) memory location 206. In this regard, the library or executable may indicate all the memory locations that may be pointed to by the object's vtable pointer at runtime. In some aspects, the vtable mapping may be compiled as a library, and linked into the program during the linking process or provided dynamically to the program at runtime (for example, as a dynamically linked library).

In other aspects, the compiler may generate and/or modify an initialization function associated with the compiled program to provide, at runtime, vtable mappings 205 for one or more respective base classes used by the program. When execution of the program is initiated, the initialization function will setup the predetermined vtable mappings in the protected area of memory for use during program execution. The protected area of memory may include a read only memory location, a location of memory designated to be accessible only by certain verification functions, or the like. Additionally or in the alternative, the compiler may generate and/or modify an initialization function for a base or subclass to provide, at runtime, the vtable mapping when a corresponding object is instantiated. Vtable mapping 205 may include, for example, vtables pointers corresponding to the base and/or one or more derived classes.

During the compilation and linking process, the compiler is configured to modify virtual call sites 207 within the program to enforce a constraint checking 208, using the previously described vtable mapping, of the call sites before the program makes a call through a respective memory location (for example, using vtable pointer 202). In this regard, at least a portion of code is modified to, so that when a virtual call is made using the call site, a subroutine is executed to perform a verification before the virtual call is made. In one example, the compiler inserts a vtable verification function call into the program code before the call site. For example, if the call site is calling one or more functions provided by an instantiated object, the verification function is inserted before each use of the instantiated object's vtable pointer. The verification function may take one or more input arguments, including the declared type of the object and the vtable pointer value of the object. When the program attempts to call a function associated with an object, the declared type of the object and the object's vtable pointer are passed to the verification function, which determines if the vtable address is valid for the declared type by a lookup against the vtable mapping for the declared type.

If the vtable pointer is verified (for example, the pointer references the location of a trusted vtable) then the virtual call is facilitated, for example, by returning the vtable address to the call site. The program uses the vtable pointer, finds the function associated with the object that it wants to call (for example, using an offset from the beginning of the vtable), and calls that function. Otherwise, if the vtable pointer cannot be verified the virtual call may be aborted, for example, by returning an error routine and halting execution. In this manner, when the program makes a virtual call through the object, the modified call site intercepts the call to verify that the object's vtable pointer, used to find the function address, is a trusted vtable pointer for the declared class of the object.

In FIG. 2, a call site 210 may have retained a stale pointer 211 a freed object 212 ("Object B"). Unbeknownst to call site 210, an attacker may have allocated a new object 213 ("Object C") which occupies the memory formally used by freed object 212. New object 213 may include a new vtable pointer 214 to the attacker's vtable 215, which ultimately points to the attacker's (malicious) code 216. When the program attempts to make a virtual call through new object 213, the modified call site intercepts the call to verify that the object's vtable pointer 214 is a trusted vtable pointer for the declared class of the object. In the depicted example, constraint checking 208 will reveal that vtable pointer 214 (and/or attackers pointer to code 215) is not associated with a trusted address 204 and abort the call.

The previously described initialization functions and verification functions may be added to a compiler library (for example, "libgcc"). The compiler may also be configured to generate shell, do nothing versions of these functions, and insert these shell functions into all modules it compiles. In this manner, if the program is executed in an environment that is missing the compiler library then the program will not fail when the functions are called.

As described previously, the subject technology stores vtable mappings 205 so that when a function is called at runtime the program can verify that it is still using the same data originally set up by the compiler, and that the data has not been changed between the compilation and runtime. The compiler may not know exactly which one of a set of trusted vtables will be used, but the compiler identifies the set of trusted vtables that must be used at predetermined points in the program execution. When the program is executed, a constraint checking module verifies that the pointer being used is indeed in the set that the compiler identified as valid for that function at that point in the program. If the pointer does not point to one of the identified set of trusted vtables then something has gone wrong.

In some aspects, the class hierarchy may be extended at runtime, and this extension may not have been anticipated at compile time. In this regard, the compiler may create an update module 209 during the compiling and linking process, and include update module 209 in the running program. The update module may monitor the program (for example, periodically) for new objects and/or code introduced into the program at runtime. If new code is added to a running program then update module 209 may determine a set of trusted vtables for each new call site, and then update the previously described vtable mappings to reflect the vtables associated with the new code (or object). Similarly, if the new code is generated upon instantiation of an object then the instantiation of the new object may initiate the analysis and update of data structures.

A computer system (for example, a personal computer, workstation, server, or the like) may be configured to implement the previously described compiler to compile new program code (for example, source code, machine code, or the like). The compiler is modified with compiler instructions that cause the computer system (for example, via a processor) to identify call sites within a program code. The compiler instructions then cause the computer system to determine, for each of the call sites, one or more trusted vtables associated with each identified call site for the program code. A vtable may be "trusted" by virtue of it being placed into a protected memory area at runtime, or by identifying that the vtable is the same vtable generated by the compiler during the build process. The vtable may be at a trusted memory location, or located by a trusted vtable pointer, that may also be determined for a call site. A vtable pointer or corresponding memory location may be "trusted" in the same manner as a trusted vtable.

Once the call sites and their corresponding trusted vtables have been identified, the compiler instructions cause the computer system to modify the program code. In one aspect, at least a portion of code associated with a call site may be modified to facilitate a verification that a vtable pointer provided to the call site is associated with at least one trusted pointer value (for example, a memory address) before the vtable pointer is used to facilitate a virtual call. The program code may be configured, for example, to detect, at execution time, an initiation of a virtual call at a call site. Upon that detection the vtable pointer or other parameters used to initiate the virtual call at the call site may be verified. The verification may be performed by a separate subroutine inserted immediately prior to the location in the program code in which the virtual call is made through the call site.

As described previously, the compiler instructions may further cause the computer system to modify the program code to include update module 209. Update module 209 may monitor, for example, a memory space associated with the running program during execution of the program code for the introduction of new executable code (for example, in connection with an instantiation of a new virtual object). If new executable code is introduced that includes one or more new call sites (and/or corresponding new subroutines), then update module 209 may determine, for each of the new call sites (or subroutines), one or more corresponding trusted vtables, vtable pointer values, vtable memory locations, subroutine memory locations, or the like, corresponding to the new call sites. On detecting the initiation of a virtual call through a new call site at runtime, the trusted value provided to the virtual call may be verified in the manner previously described.

Figure 3:
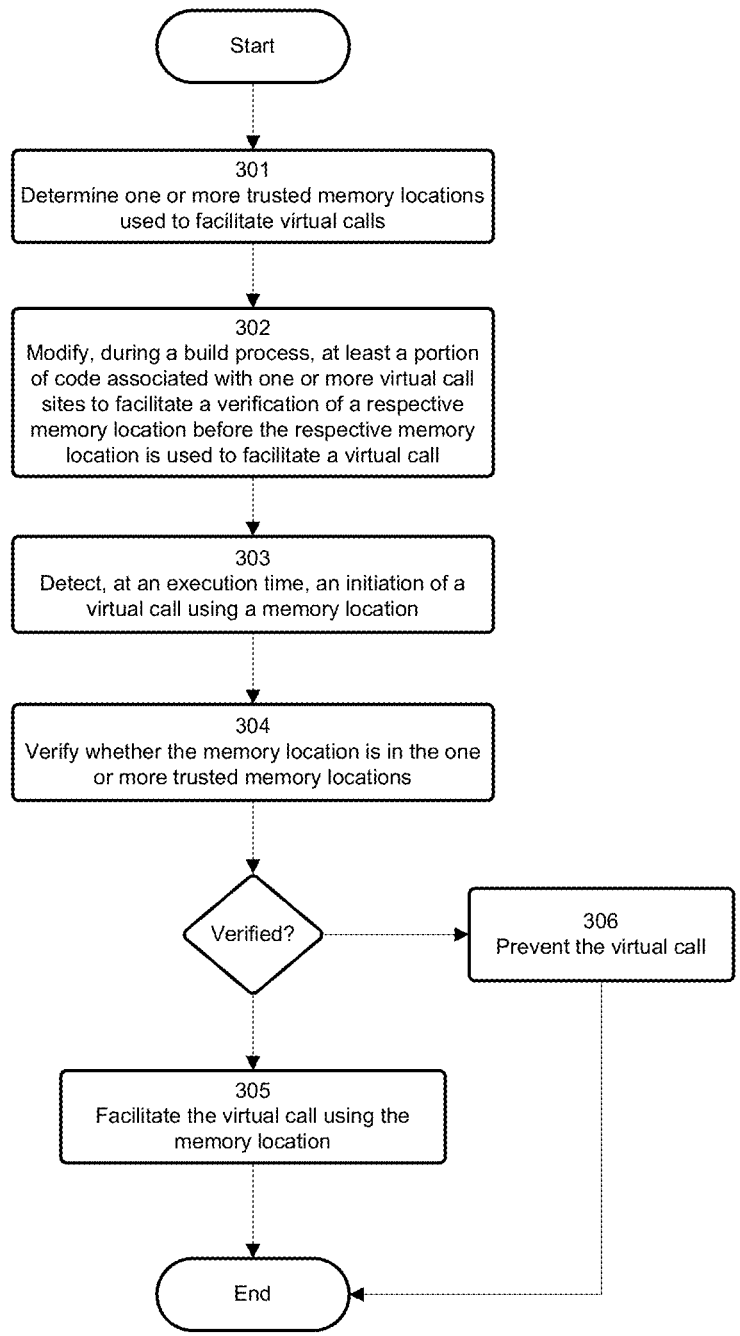
FIG. 3 is a flowchart illustrating a first example method for detecting and handling corruption of pointers used in connection with virtual function calls.

FIG. 3 is a flowchart illustrating a first example method for detecting and handling corruption of pointers used in connection with virtual function calls. According to some aspects, the blocks of FIG. 3 may be executed by one or more computing devices (for example, a desktop or server computer, tablet or notebook computer, personal data assistant, smart phone, a television or other display device with one or more computing devices embedded therein or attached thereto, or the like). In block 301, one or more trusted memory locations used to facilitate virtual calls are determined. In one aspect, each of the one or more trusted memory locations corresponds to a location of a virtual function table. The virtual function table may include an array of one or more pointers to a respective subroutine. In another aspect, determining one or more trusted memory locations used to facilitate virtual calls comprises determining one or more declared object types. In this respect, the virtual function table corresponds to one or more subroutines implemented by the declared object type. The memory location of each virtual function table is determined for the execution time, for example, by determining where the memory location will be allocated (and fixed) when the program is initiated.

In block 302, at least a portion of code associated with one or more virtual call sites may be modified to facilitate a verification of a respective memory location before the respective memory location is used to facilitate a virtual call. In one aspect, a virtual call comprises a call, through a memory location, to initiate a first subroutine implemented by a virtual object. The portion of code may be modified to, when the respective virtual call is initiated, execute a second subroutine before the first subroutine is initiated, the second subroutine verifying whether the memory location used by the virtual call is in the one or more trusted memory locations. In another aspect, the portion of code may be modified during a build process, for example, during a compiling and linking of source code by a compiler. Additionally or in the alternative, the build process may include a linking of one or more libraries during the initiation or execution of a running program. For example, the running program may be linked at runtime to a dynamically linked library (DLL).

In block 303, at an execution time, an initiation of a virtual call using a memory location may be detected. The initiation of a virtual call using a memory location may include, for example, making a call, through the memory location, to initiate the corresponding subroutine. On detecting the virtual call, in block 304, a verification is performed to determine whether the memory location is in the one or more trusted memory locations. If the memory location can be verified then, in block 305, the virtual call is facilitated using the memory location. Otherwise, in block 306, if the memory location cannot be verified, the virtual call is prevented. Preventing the virtual call may comprise aborting, blocking, or bypassing the virtual call, initiating an error routine, or the like.

In some aspects, the program code includes one or more initialization functions. On an execution of an initialization function, a vtable mapping is stored in memory for use at the execution time. The vtable mapping includes a mapping of declared object types to one or more trusted memory locations. In other aspects, the initialization functions may be created or modified as part of the build process. In this respect, object type definitions (for example, source code defining a class) may be modified to include an initialization function which is executed on instantiation of a corresponding object. The initialization function may, for example, store vtable mappings corresponding to the object in memory upon instantiation of the object in memory.

Figure 4:
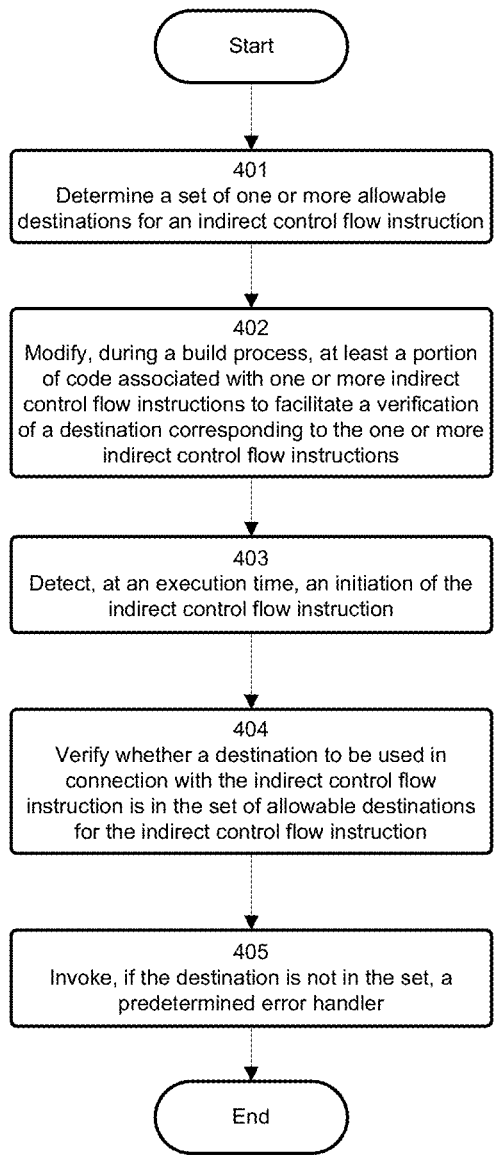
FIG. 4 is a flowchart illustrating a second example method for detecting and handling corruption of pointers used in connection with virtual function calls.

FIG. 4 is a flowchart illustrating a second example method for detecting and handling corruption of pointers used in connection with virtual function calls. In block 401, a set of one or more allowable destinations for an indirect control flow instruction is determined. The compiler determines, during a build process for program code (for example, at compile time), where indirect control flow instructions in the program code are directed. For example, for a function pointer, the compiler may determine that an indirect control flow instruction should point to the starting address of a corresponding function. The compiler may then store the starting address with addresses of other corresponding functions and make this information available at runtime. In this regard, in block 402, during the build process, at least a portion of code associated with one or more indirect control flow instructions is modified to facilitate a verification of a destination (for example, address) corresponding to the one or more indirect control flow instructions. Additionally or in the alternative, the information may be modified and/or updated at runtime (for example, due to dlopen( ) or JIT compilation).

In block 403, at an execution time, an initiation of the indirect control flow instruction is detected. In block 404, a destination to be used in connection with the indirect control flow instruction is verified to determine whether the destination is in the set of allowable destinations for the indirect control flow instruction. If the destination is not in the set, in block 405, a predetermined error handler is invoked. The error handler may be a subroutine responsible for returning an error, aborting or bypassing the indirect control flow instruction, or the like.

Figure 5:
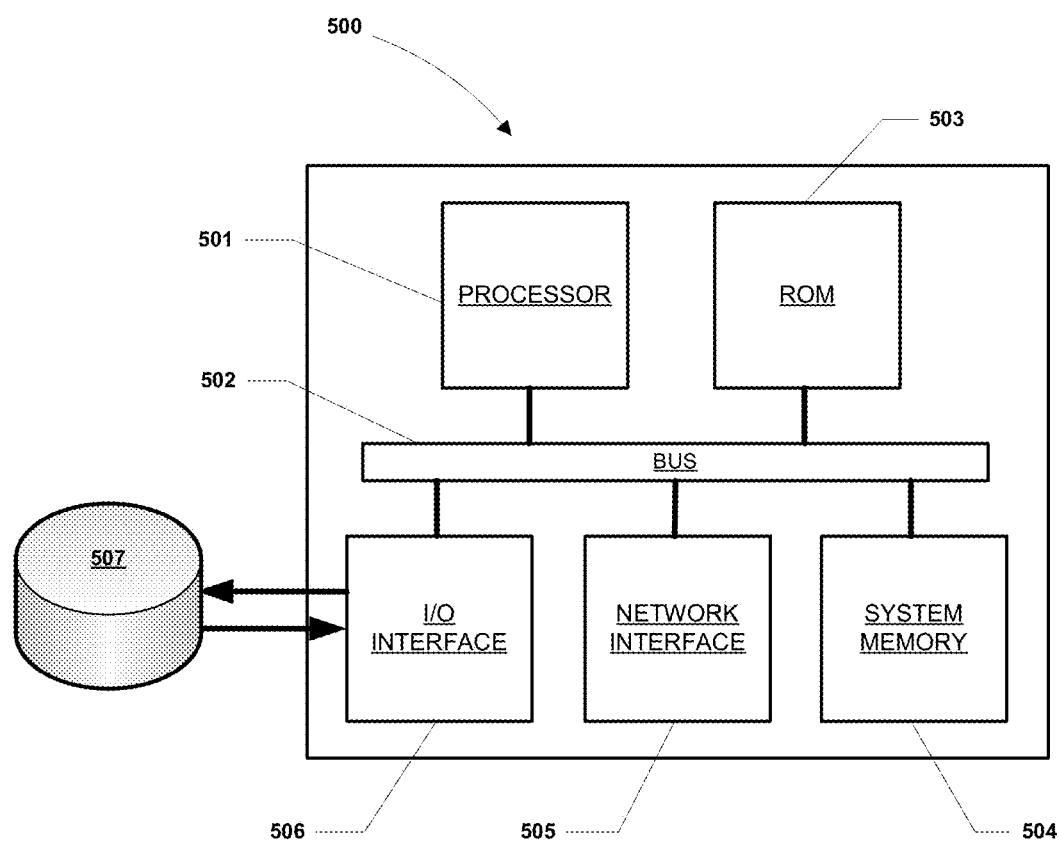
FIG. 5 is a diagram illustrating an example machine or computer for detecting and handling corruption of pointers used in connection with virtual function calls, including a processor and other internal components.

FIG. 5 is a diagram illustrating an example machine or computer for detecting and handling corruption of pointers used in connection with virtual function calls, including a processor and other internal components, according to some aspects of the subject technology. In some aspects, a computerized device 500 (for example, a computing device configured to execute the processes of FIG. 3 or 4, or the like) includes several internal components, for example, a processor 501, a system bus 502, read-only memory 503, system memory 504, network interface 505, I/O interface 506, and the like. In some aspects, processor 501 may also be in communication with a storage medium 507 (for example, a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in device 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from system memory 504, ROM 503, or received from a storage medium 507 (for example, via I/O interface 506). ROM 503, system memory 504, and storage medium 507 represent examples of machine or computer readable media on which instructions/code may be executable by processor 501. Machine or computer readable media may generally refer to any (for example, non-transitory) medium or media used to provide instructions to processor 501, including both volatile media, for example, dynamic memory used for system memory 504 or for buffers within processor 501, and non-volatile media, for example, electronic media, optical media, and magnetic media.

In some aspects, processor 501 is configured to communicate with one or more external devices (for example, via I/O interface 506). Processor 501 is further configured to read data stored in system memory 504 or storage medium 507 and to transfer the read data to the one or more external devices in response to a request from the one or more external devices. The read data may include one or more web pages or other software presentation to be rendered on the one or more external devices. The one or more external devices may include a computing system, for example, a personal computer, a server, a workstation, a laptop computer, PDA, smart phone, and the like.

In some aspects, system memory 504 represents volatile memory used to temporarily store data and information used to manage device 500. According to some aspects of the subject technology, system memory 504 is random access memory (RAM), for example, double data rate (DDR) RAM. Other types of RAM also may be used to implement system memory 504. Memory 504 may be implemented using a single RAM module or multiple RAM modules. While system memory 504 is depicted as being part of device 500, it will be recognized that system memory 504 may be separate from device 500 without departing from the scope of the subject technology. Alternatively, system memory 504 may be a non-volatile memory, for example, a magnetic disk, flash memory, peripheral SSD, and the like.

I/O interface 506 may be configured to be coupled to one or more external devices, to receive data from the one or more external devices and to send data to the one or more external devices. I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, for example, Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 or the internal devices operably attached thereto.

Various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description provides various examples of the subject technology, and the subject technology is not limited to these examples. Various modifications to these aspects will be readily apparent, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method, comprising:
   determining one or more trusted memory locations used to facilitate virtual calls;
   modifying, during a build process, at least a portion of code associated with one or more virtual call sites to facilitate a verification of a respective memory location before the respective memory location is used to facilitate a virtual call;
   detecting, at an execution time, an initiation of a virtual call using a memory location;
   verifying whether the memory location is in the one or more trusted memory locations; and
   facilitating the virtual call using the memory location if the memory location can be verified, and
   preventing the virtual call if the memory location cannot be verified,
   wherein each of the one or more trusted memory locations corresponds to a respective stored location of a virtual function table,
   and wherein each virtual function table includes an array of one or more pointers to one or more respective subroutines.

2. The computer-implemented method of claim 1, wherein the build process includes a compiling and linking of source code.

3. The computer-implemented method of claim 1, wherein the build process includes a linking of one or more libraries during the initiation or execution of a running program.

4. The computer-implemented method of claim 1, wherein the initiation of a virtual call using a memory location comprises making a call to initiate a subroutine through the memory location.

5. The computer-implemented method of claim 1, wherein determining one or more trusted memory locations used to facilitate virtual calls comprises:
   determining one or more declared object types; and
   for each declared object type, determining a memory location of the virtual function table corresponding to one or more subroutines implemented by the declared object type, the memory location of the virtual function table being determined for the execution time.

6. The computer-implemented method of claim 1, further comprising:
   storing, in a protected area of memory, a vtable mapping that maps one or more declared object types to the one or more trusted memory locations, the vtable mapping for use at the execution time.

7. The computer-implemented method of claim 1, wherein the code includes one or more initialization functions, the method further comprising:
   on an execution of an initialization function, storing, in memory, a vtable mapping that maps one or more declared object types to the one or more trusted memory locations, the vtable mapping for use at the execution time.

8. The computer-implemented method of claim 1, wherein a virtual call comprises a call, through a memory location, to initiate a first subroutine implemented by a virtual object,
   wherein modifying at least a portion of code associated with a respective virtual call comprises modifying the portion of code to, when the respective virtual call is initiated, execute a second subroutine before the first subroutine is initiated, the second subroutine verifying whether the memory location used by the virtual call is in the one or more trusted memory locations.

9. The computer-implemented method of claim 1, further comprising:
   monitoring a memory space for the introduction of new executable code into a running program, the new executable code comprising one or more virtual call sites;
   determining, for each of the one or more virtual call sites, one or more corresponding trusted memory locations used to facilitate a virtual call by the virtual call site; and
   on detecting an initiation of a virtual call associated with the new executable code, verifying whether a memory location used by the virtual call is in the one or more corresponding trusted memory locations.

10. The computer-implemented method of claim 1, wherein the new executable code is introduced in connection with an instantiation of a new virtual object.

11. The computer-implemented method of claim 1, wherein the new executable code further comprises one or more subroutines corresponding to the one or more virtual call sites.

12. The computer-implemented method of claim 1, wherein preventing the virtual call comprises initiating an error routine.

13. A computer-implemented method, comprising:
   determining a set of one or more allowable destinations for an indirect control flow instruction;
   modifying, during a build process, at least a portion of code associated with one or more indirect control flow instructions to facilitate a verification of a destination corresponding to the one or more indirect control flow instructions;
   detecting, at an execution time, an initiation of the indirect control flow instruction;
   verifying whether a destination to be used in connection with the indirect control flow instruction is in the set of allowable destinations for the indirect control flow instruction; and
   invoking, if the destination is not in the set, a predetermined error handler,
   wherein each of the one or more allowable destinations corresponds to a respective stored location of a virtual function table,
   and wherein each virtual function table includes an array of one or more pointers to one or more respective subroutines.

14. A non-transitory machine-readable media including instructions thereon that, when executed, perform a method, the method comprising:
   identifying one or more call sites used to facilitate virtual calls;

determining, for each of the call sites, one or more trusted pointer values for the call site;

detecting, at an execution time, an initiation of a virtual call using a first call site;

verifying whether a pointer provided to the first call site is associated with at least one of the trusted pointer values; and facilitating the virtual call using the call site if the pointer can be verified, and aborting the virtual call if the memory location cannot be verified, wherein each of the one or more trusted pointer values corresponds to a respective stored location of a virtual function table, and wherein each virtual function table includes an array of one or more pointers to one or more respective subroutines.

15. The non-transitory machine-readable media of claim 14, the method further comprising:

wherein determining one or more trusted pointer values for the call site includes determining one or more corresponding trusted virtual tables that facilitate a virtual call by the call site.

16. The non-transitory machine-readable media of claim 14, the method further comprising:

modifying, for each of the call sites, at least a portion of code associated with the call site to facilitate a verification that a pointer provided to the call site is associated with at least one of the trusted pointer values before the pointer is used to facilitate a virtual call.

17. The non-transitory machine-readable media of claim 14, wherein determining one or more trusted pointer values for the call site comprises:

determining one or more declared object types corresponding to the call site; and for each declared object type, determining a pointer value corresponding to the virtual function table for one or more subroutines implemented by the declared object type, the pointer value being determined for the execution time.

18. The non-transitory machine-readable media of claim 14, the method further comprising:

monitoring a memory space for the introduction of new executable code associated with a running program, the new executable code comprising one or more second call sites;

determining, for each of the one or more second call sites, one or more corresponding trusted pointer values; and on detecting an initiation of a virtual call associated with the new executable code, verifying whether a pointer provided to the virtual call is associated with at least one of the corresponding trusted pointer values.

19. A system, comprising:

a processor;

and a memory, including compiler instructions that, when executed, cause the processor to:

identify, in a program code, one or more call sites used to facilitate a call to a subroutine associated with a declared object type;

determine, for each of the call sites, one or more trusted locations of a corresponding subroutine;

and configure the program code to:

detect, at an execution time, an initiation of a virtual call at a call site;

verify that a subroutine location used in connection with the call site is associated with at least one of the trusted locations; and facilitate the virtual call using the call site, wherein each of the one or more trusted memory locations corresponds to a respective stored location of a virtual function table, and wherein each virtual function table includes an array of one or more pointers to one or more respective subroutines.

* * * * *